United States Patent
Rinne et al.

(10) Patent No.: US 7,835,745 B2
(45) Date of Patent: Nov. 16, 2010

(54) IN-BAND SET-UP AND CONFIGURATION OF TRANSFER-RELATED RESOURCES

(75) Inventors: Mikko Rinne, Helsinki (FI); Carl Eklund, Helsinki (FI)

(73) Assignee: Nokia Corporation, Espoo (FI)

( * ) Notice: Subject to any disclaimer, the term of this patent is extended or adjusted under 35 U.S.C. 154(b) by 329 days.

(21) Appl. No.: 11/181,691

(22) Filed: Jul. 13, 2005

(65) Prior Publication Data

US 2006/0018318 A1 Jan. 26, 2006

(30) Foreign Application Priority Data

Jul. 15, 2004 (WO) .................. PCT/IB2004/002296

(51) Int. Cl.
*H04W 36/00* (2009.01)
*H04W 4/00* (2009.01)
(52) U.S. Cl. ...................... 455/442; 370/331
(58) Field of Classification Search .................. None
See application file for complete search history.

(56) References Cited

U.S. PATENT DOCUMENTS

| | | | |
|---|---|---|---|
| 6,760,303 B1 * | 7/2004 | Brouwer | 370/229 |
| 6,778,509 B1 * | 8/2004 | Ravishankar et al. | 370/322 |
| 6,999,434 B1 * | 2/2006 | Agrawal et al. | 370/331 |
| 2003/0069988 A1 | 4/2003 | Rune et al. | 709/237 |
| 2003/0081547 A1 * | 5/2003 | Ho | 370/229 |
| 2003/0235196 A1 * | 12/2003 | Balachandran et al. | 370/392 |
| 2004/0071108 A1 * | 4/2004 | Wigell et al. | 370/328 |

OTHER PUBLICATIONS

"Signalling Issues and Call Admission Control in Multimedia Satellite Networks", Iera et al., Wireless Communications and Networking Conference, 2000. IEEE, vol. 3, Sep. 23, 2000, pp. 1372-1377.

* cited by examiner

*Primary Examiner*—Nick Corsaro
*Assistant Examiner*—Joel Ajayi

(57) ABSTRACT

This invention relates to a method for setting up transfer-related resources, comprising assigning (401) an identifier (12a, 212a) to at least one data unit (12, 212), wherein said identifier associates said at least one data unit with a first entity (10, 210, 510) in a first network node (501), transferring (404) said at least one data unit from said first node to a second node (502), and setting up a second entity (11, 211, 511) in said second network node after at least one of said at least one data units has been transferred from said first network node to said second network node, wherein said second entity is associated with said at least one data unit via said identifier and wherein said first and second entity jointly implement a function related to the transfer of said at least one data unit. The invention further relates to a computer program, a computer program product, a system and a device.

33 Claims, 4 Drawing Sheets

IN-BAND SET-UP AND CONFIGURATION OF TRANSFER-RELATED RESOURCES

FIELD OF THE INVENTION

This invention relates to a method for setting up transfer-related resources.

BACKGROUND OF THE INVENTION

Radio communication systems of the fourth generation (4G) are designed for best possible support of traffic that is based on the Internet Protocol (IP). For instance, a typical application in 4G systems may be the download of an Internet homepage, represented by a flow of IP packets, onto a hand-held device via the air interface of a cellular system or a Wireless Local Area Network (LAN). Therein, the actual transmission of the IP packets is performed by a transparent or non-transparent radio bearer.

Even though Quality of Service (QoS) negotiation mechanisms have been developed for the IP, the general rule remains that IP QoS is highly volatile and can be different for each flow of IP packets.

Prior art cellular radio systems have been built on the assumption originating from the circuit-switched era, that QoS is managed through negotiation of transmission parameters for the whole chain of participating nodes of the network (for instance, from the hand-held device to the Internet node providing the Internet homepage that is downloaded) prior to the start of the transmission. However, due to the inherent flexibility of IP traffic, radio bearers that are set up based on prior end-to-end negotiation are not as attractive as before, because a large number of these over-the-air pre-negotiations is required then, causing extra signalling traffic and slowing down the start of the actual transmission.

SUMMARY OF THE INVENTION

In view of the above-mentioned problems, it is, inter alia, a general object of the present invention to provide a method, a computer program, a computer program product, devices and a system for setting up transfer-related resources in a more efficient and flexible way.

A method is proposed for setting up transfer-related resources, comprising assigning an identifier to at least one data unit, wherein said identifier associates said at least one data unit with a first entity in a first network node, transferring said at least one data unit from said first network node to a second network node, setting up a second entity in said second network node after at least one of said at least one data units has been transferred from said first network node to said second network node, wherein said second entity is associated with said at least one data unit via said identifier and wherein said first and second entity jointly implement a function related to the transfer of said at least one data unit.

Said transfer-related resources may be understood as a generic term for all physical and logical components that serve the purpose of transferring data between said first and second network node. Said network nodes, in turn, may be understood as any physical or logical point in a data network where the data transmitted in the network is or may be made accessible. For instance, if said network is a radio communication system with IP-based traffic, said first network node may be a hand-held device, and said second network node may be a Base Transceiver Station (BTS).

According to a first step of the present invention, an identifier is assigned to at least one data unit, which may for instance be a Protocol Data Unit (PDU). This data unit may contain at least parts of one or several data packets of a data flow that is to be transmitted from said first to said second network node. Said identifier may be any value, symbol or other element that allows a differentiation of various data units. Several data units may be assigned the same identifier, for instance if they stem from the same data flow. Said assignment may include the addition or incorporation of said identifier into said data unit. Said assignment may be performed by said first entity or by other instances in said first network node. Said first entity may already exist in said first network node, or may have been actually established to be associated with said at least one data unit, for instance to process and/or control said at least one data unit.

Said identifier associates said at least one data unit with said first entity. For instance, all data units that have been assigned a first identifier may be processed and/or controlled by said first entity, and data units that have been assigned a second identifier may be processed and/or controlled by a different entity in said first network node. Therein, said entity may represent a protocol entity or any other instance that may be involved in the transfer of data units, for instance an entity of a Radio Link Control (RLC) protocol that performs Automatic Repeat Request (ARQ) for said data units. Said entity may also represent a coding/decoding structure or a similar data processing path.

According to a second step of the present invention, said at least one data unit is then transferred to a second network node. This transfer may take place logically or physically. Before and/or after said transfer, said at least one data unit may be subject to further processing at both the first and second network node. The format of said at least one data unit may thus have changed during said transfer, in particular said at least one data unit may have been divided into smaller parts or furnished with additional transfer information such as for instance pre- or post-fixes.

According to a third step of the present invention, in said second network node, a second entity is set up after at least one of said at least one data units has been transferred from said first network node to said second network node. For instance, if a plurality of data units, that are all assigned the same identifier, are transferred, after reception of the first data unit, said second entity is set up. Said second entity thus did not exist when the transfer of the first of said at least one data units started, it is only set up upon reception of the first of said at least one data units, but then may be maintained for the control and/or processing of further data units. Said second entity is associated with said at least one data unit via said identifier. For instance, if a plurality of data units is assigned the same identifier, said plurality of data units may be controlled and/or processed by said second entity, and further data units that are assigned a different identifier may then be controlled and/or processed by different entities, respectively.

Said first and second entity jointly implement a function related to the transfer of said at least one data unit. Said function may be any function that at least partially enables, controls, monitors, structures or improves the transfer of said at least one data units or is in any other way related to said transfer. Said functions may for instance be services typically offered by protocols of the lower four layers of the common International Standardisation Organisation (ISO) Open Systems Interconnection (OSI) protocol stack. In said first network node, said identifier associates said data units with said first entity, and in said second network node, said identifier associates the same data units with said second entity. It is thus possible to jointly control and/or process the same data units in both the first and second network node. For instance, if the first entity performs segmentation of data units, the second entity may perform re-assembly of said data units. As a further example, said first and second entity may jointly perform an ARQ mechanism on the transferred data units.

According to the present invention, the first and second entity that jointly implement a function related to the transfer of said at least one data unit are not set up prior to transmission, as it is performed in prior art systems. In contrast, at least the second entity is only set-up upon reception of a data unit from said first network node. The identifiers assigned to the data units allow to associate several data units, for instance data units originating from the same data packet flow, with the same first and second entity in said first and second network node, respectively. If there are several data packet flows, the data units of each data packet flow are assigned an own identifier each, and via said identifier, the association of these data units with further first and second entities in said first and second network node is accomplished. Thus even if several identifiers are assigned to data units of different data packet flows at the first network node, correct assignment of the respective data units to the correct second entities at the second network node is possible without any need to establish the pairs of first and second entities for the respective data packet flows prior to the transfer of the first data units. Consequently, according to the present invention, data units can be directly transferred from the first to the second network node without having to wait for a preceding negotiation procedure for the set-up of first and second entities in said first and second network node. The second entities are generated on demand, i.e. whenever the second network node recognises that a data unit is received that has been assigned an identifier for which no second entity has been set up in the second network node yet. Once a second entity for said data units with said identifier has been set up, all future received data units that were assigned the same identifier may be controlled and/or processed by this set-up second entity as well. This principle of generating the second entities on demand can be considered as in-band set-up of entities, because no connection (or bearer) has to be explicitly established by using the services of lower protocol layers, as for instance sending connect request/indication/response/confirm primitives via lower protocol layers.

An embodiment of the present invention further comprises the step of removing said first and/or second entities if, for a predetermined time, no data units associated with said respective first and/or second entity have been transferred from said first network node to said second network node. Then the entities may be only provided for the time when actual transfer of data units takes place and a short time afterwards, which is defined by said predetermined time. Removing those unused entities allows for a dynamic clearance of transmission resources, which is advantageous in combination with the on-demand set-up of entities. Entities then may only be set up if transfers of data units actually take place.

A further embodiment of the present invention, wherein a plurality of data units is associated with respective first and second entities via respective identifiers, further comprises the steps of checking if a maximum number of second entities has been set up in said second network node, and, if this is the case, checking if, for a predetermined time, no data units associated with one of said second entities have been transferred from said first network node to said second network node, and, if this is the case for one of said second entities, removing said one second entity. In this embodiment, data units of several data packet flows are transferred between said first and second network node, wherein the data units of each data packet flow are associated with respective first and second peer entities in said first and second network node, respectively. If a data unit with an identification for which no second entity yet exists is received at said second network node, and if it is then recognised that, for instance due to limited transmission resources such as hard- or software capabilities, no further second entity can be set up at said second network node, it is checked if some of the already set-up second entities are actually unused. This may for instance be determined by the time duration since the last transfer of data units said second entities are associated with. If this time duration is larger than a predetermined time, the corresponding second entity is considered to be unused and is removed to free transmission resources and thus to allow for the set-up of an actually required second entity. Said predetermined time in this overload case may for instance be smaller than the predetermined time that is used for the standard removal of entities, as it was described in the preceding embodiment.

According to a further embodiment of the present invention, information related to the transfer of said data units is added to said data units in said first network node and processed in said second network node to configure said second entity. Said information related to said transfer of said data units may comprise any information that explicitly or implicitly and at least partially may be used to enable, control, monitor, structure or improve the transfer of said data units between said first and second network node. Said information is added to said data units, for instance by incorporating it into an existing section of said data unit (e.g. a header section), or by adding a new section to said data units (e.g. a header section). At said second entity, said information is processed, for instance extracted from said data units and analysed, and used to configure said second entity. This in-band configuration of said second entity is advantageous in combination with the on-demand in-band set-up of said second entities, because at said second network node, when recognising that a second entity has to be set up for a received data unit, not enough information may be available to properly configure said second entity. Thus the second entity may be set up with a basic or standard configuration, which may be refined by the information added to said data units. In-band configuration inherently may cause increased resource consumption, but in cases of high variance of the parameter that is in-band configured, in-band configuration can be a great benefit to overall system transmit quality and flexibility.

According to a further embodiment of the present invention, said second entity is set up at least partially with pre-defined set-up parameters. Said pre-defined parameters may for instance be prescribed by a specification or standard, or may otherwise be indicated prior to the set-up procedure. If said set-up of said second entity is entirely based on pre-defined set-up parameters, no bandwidth has to be sacrificed for the in-band signalling of such set-up parameters. This is especially advantageous in situations were a standard set-up configuration can be used for the second entity.

According to a further embodiment of the present invention, parameters of said second entity can be modified by in-band or explicit signalling. It then is possible to modify the configuration of the already set-up second entity, for instance due to changes in the transmission conditions or due to changes in the characteristics of the data flow the transferred data units stem from. This technique then allows a very flexible and efficient way of setting up transfer-related resources, in particular if the set-up of the second entity is entirely based on pre-defined set-up parameters.

According to the present invention, said first and second entities may be peer protocol entities that at least partially operate a protocol between said first and second network node. Said protocol may for instance be a physical layer, link layer, session layer of transport layer protocol.

According to the present invention, said data units may stem from packet-based traffic. Said data units may for instance be Protocol Data Units (PDUs) that contain data packets of said packet-based traffic as payload.

According to the present invention, said data units may stem from Internet protocol based traffic. Said data units may for instance be Protocol Data Units (PDUs) that contain data packets of said internet protocol based traffic as payload.

According to the present invention, said network nodes may be nodes of an at least partially wireless data transmission network. Said wireless data transmission network may for instance be a 3G or 4G cellular radio communication system or a wireless local area network.

According to the present invention, said protocol may be a radio link control protocol. Said radio link protocol may for instance provide error control for a transparent radio bearer.

According to the present invention, said function related to the transfer of said at least one data unit may be an automatic repeat request function. Said automatic repeat request function may comprise functionality to detect errors in transferred data units and to trigger the re-transmission of erroneous data units.

According to the present invention, said function related to the transfer of said at least one data unit may be a segmentation and re-assembly function or a blocking and de-blocking function or a concatenation and separation function or a multiplexing and de-multiplexing function or a splitting and combining function.

A computer program is further proposed with instructions operable to cause a processor to perform the above-mentioned method steps.

A computer program product is further proposed comprising a computer program with instructions operable to cause a processor to perform the above-mentioned method steps.

A system for setting up transfer-related resources is further proposed, comprising means arranged for assigning an identifier to at least one data unit, wherein said identifier associates said at least one data unit with a first entity in a first network node; means arranged for transferring said at least one data unit from said first network node to a second network node; means arranged for setting up a second entity in said second network node after at least one of said at least one data units has been transferred from said first network node to said second network node, wherein said second entity is associated with said at least one data unit via said identifier and wherein said first and second entity jointly implement a function related to the transfer of said at least one data unit.

A device for setting up transfer-related resources is further proposed, comprising means arranged for receiving at least one data unit that is transferred to said device from a network node, wherein said at least one data unit has been assigned an identifier that associates said at least one data unit with a first entity in said network node, and means arranged for setting up a second entity in said device after at least one of said at least one data units has been transferred from said network node to said device, wherein said second entity is associated with said at least one data unit via said identifier and wherein said first and second entity jointly implement a function related to the transfer of said at least one data unit.

A device for setting up transfer-related resources is further proposed, comprising means arranged for assigning an identifier to at least one data unit, wherein said identifier associates said at least one data unit with a first entity in said device; and means arranged for transferring said at least one data unit from said device to a network node; wherein said first entity and a second entity, which is set up in said network node after at least one of said at least one data units has been transferred from said device to said network node, and which is associated with said at least one data unit via said identifier, jointly implement a function related to the transfer of said at least one data unit.

According to the present invention, said device may be a terminal of an at least partially wireless data transmission network.

According to the present invention, said device may be a network element of an at least partially wireless data transmission network.

These and other aspects of the invention will be apparent from and elucidated with reference to the embodiments described hereinafter.

DETAILED DESCRIPTION OF THE INVENTION

Figure 1:
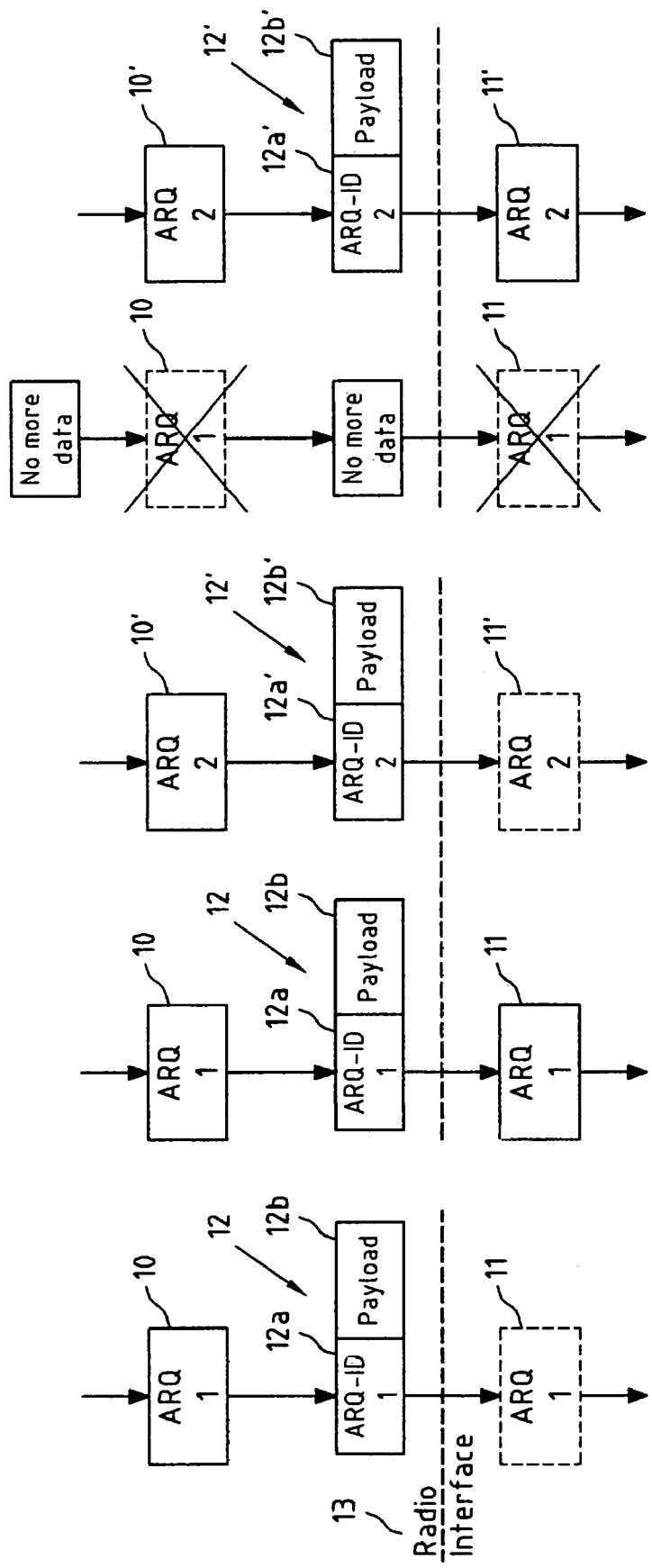
FIGS. 1a-1c: A schematic presentation of an exemplary in-band set-up of Automatic Repeat Request (ARQ) protocol entities according to the present invention.

The present invention proposes that entities in first and second (or transmitting and receiving) nodes of a data transmission network are used without an explicit set-up-procedure, but based on pre-determined rules to signal to the receiving entity, that these entities need to be initialized. These rules may for instance be based on the assignment of identifiers to data units that are to be transmitted between nodes of the network. An example set of rules may for instance be:

If the receiving node receives a data unit with an identifier, for which no corresponding entity exists, such an entity is established.

If an existing entity has been unused for a predetermined time, the entity is deleted.

If a previously unused identifier would require a new entity to be established, but the maximum value of such entities supported by the receiving node has been reached, it shall first be checked, whether any previously set-up entities are currently in an unused state, and, if this is the case, the unused entity shall be removed in order to set-up the new one. If the corresponding set-up cannot be done, an error notification may be sent to the transmitting node.

Additionally, the maximum capability of the network node to create entities may be either specified in a standard, or negotiated between network nodes, for instance between a mobile terminal and the network, for instance at the time of attaching to the network or activating the terminal. This negotiation may for instance take place by means of a "Mobile Terminal Capability Information" message, which may include parameters indicative of the mobile terminal capability to set-up entities, that may for instance provide distinct coding/decoding paths or be protocol entities of a radio link control protocol.

FIGS. 1a-1c schematically depict an example of a dynamic creation of ARQ entities (11, 11') in a receiving node of a network according to the present invention. Said ARQ entities (10, 10', 11, 11') may for instance be protocol entities of a Radio Link Control (RLC) protocol that provides an ARQ mechanism in order to detect and correct erroneous Protocol Data Units (PDUs 12, 12'). The payload of these PDUs stems from a first data flow. The PDUs are transmitted by a transparent radio bearer over a radio interface 13 between a transmitting node and a receiving node of a data transmission network. The error detection and correction set on top of said transparent bearer by said RLC protocol may for instance be achieved by adding a Frame Check Sequence (FCS) to the PDUs at the transmitting node and to check at the receiving node if the FCS was correctly received. If the FCS indicates that the PDU was not correctly received, a negative acknowledgement may be sent back (for instance, piggy-backed with PDUs) to the transmitting node to trigger the repetition of the transmission of a PDU. Otherwise, a positive acknowledgement may be returned.

According to FIG. 1a, data packets of said first data flow have to be transmitted over the radio interface 13. Thus, according to the present invention, an ARQ entity identifier ARQ-ID 12a is established in a header structure preceding the payload structure 12b of an RLC PDU 12, which is used for the transmission of said data packets of said first data flow by said RLC. For instance, said ARQ-ID 12a may be chosen as "1", and a corresponding ARQ entity 10 may then be established and associated with this ARQ-ID 12a. The PDU 12 is then transmitted over the radio interface 13.

The receiving node gets a PDU 12 having an ARQ-ID 12a with no corresponding ARQ entity being present at said receiving node. According to the present invention, a new ARQ entity 11 is thus automatically set up for ARQ-ID 12a (given as dashed box in FIG. 1a).

According to FIG. 1b depicting the next phase of the example, ARQ entities 10 and 11 in the transmitting and receiving nodes exist (solid boxes in FIG. 1b), but another (second) data flow emerges with different transmission characteristics, i.e. requiring a different set of ARQ peer entities (10' and 11'). A new ARQ entity 10' is thus created in the transmitting node and the ARQ-ID 12a' in the RLC PDU 12' is set to "2". The receiving node, upon reception of the first PDU 12', accordingly and automatically establishes an ARQ entity 11' in the receiving node (dashed box) to serve as a peer entity to ARQ 10' in the transmitting node. In effect, then the ARQ service for the PDUs 12' has been completely set up, based on the peer ARQ entities 10' and 11'.

According to FIG. 1c depicting the final phase of the example, transmission of the first data flow finishes with no outstanding packets to be transmitted. According to the present invention, both transmitting and receiving node may thus now delete the obsolete ARQ entities associated with the first data flow, i.e. ARQ entity 10 and 11 (illustrated by the cancelled boxes 10 and 11 of FIG. 1c). If, after this, more data packets emerge on the same data flow, the transmitting node may either continue to use ARQ-ID "1" (if it is still available), in which case the receiving node will re-establish ARQ entity 11. If ARQ-ID "1" has already been taken by another data flow, another available ARQ-ID can be used. The addressing of the data flows outside the RLC domain may be managed by the IP-addresses, therefore it may not matter if the ARQ-IDs within the RLC protocol vary even through the transmission of the same data flow, as long as individual packets are passed through without errors.

Figure 2:
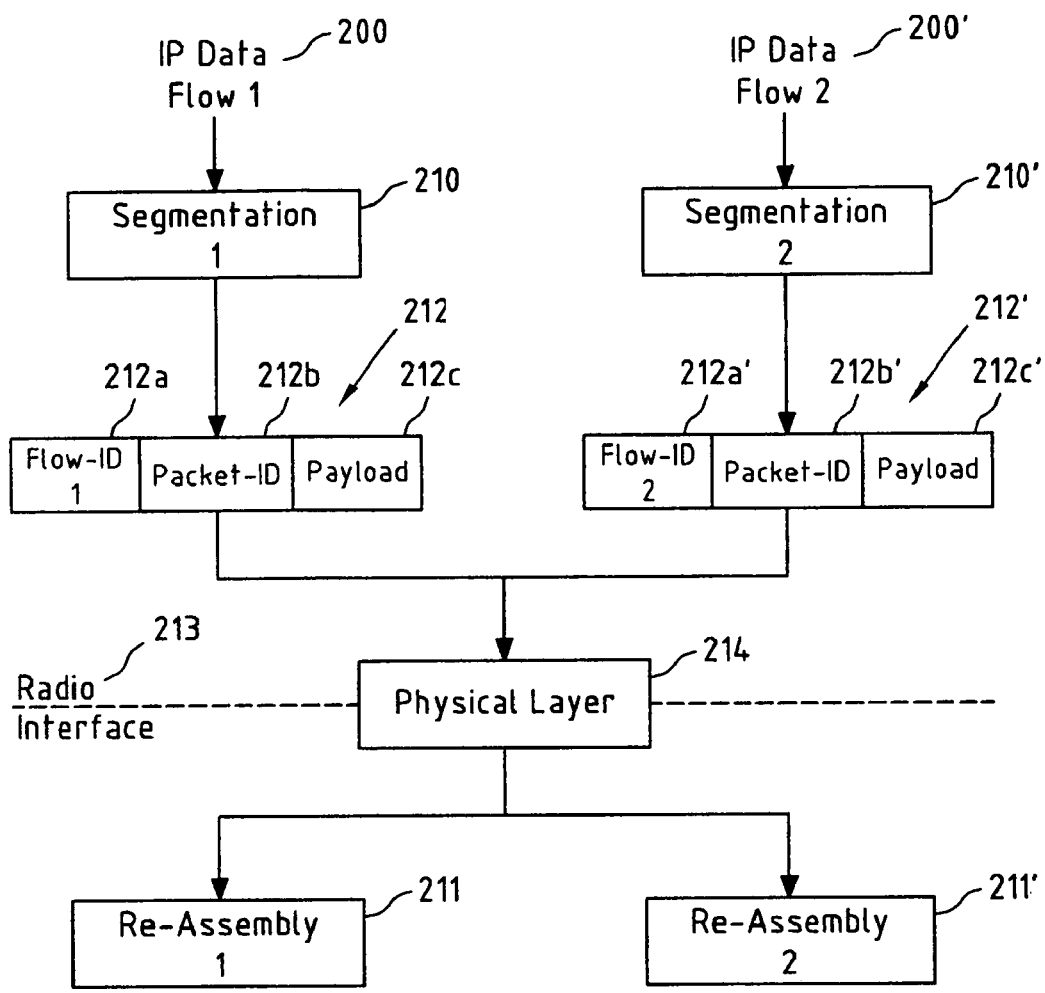
FIG. 2: a schematic presentation of an exemplary in-band set-up of transmission paths according to the present invention.

FIG. 2 depicts an example of a dynamic data transmission path set-up according to the present invention, wherein transmission paths are set up by assigning identifiers to data units that are transferred to a receiving node and wherein at the receiving node, entities constituting parts of said transmission paths are automatically established upon reception of said data units with said assigned identifiers. In FIG. 2, initially there is only one data flow, for instance a first IP data flow 200, which is subject to some segmentation operation in a segmentation entity 210. Said segmentation fits data packets of said IP data flow 200 into the payload section 212c of PDUs 212 for transmission over a radio interface 213. For the purpose of re-assembling packets contained in the payload section 212c of said PDUs 212 in segmented form prior to delivery to upper layers in the receiving node, as it is indicated by re-assembly entity 211, a packet-ID 212b is established to tie together segments of the same data packet. Thus a transmission path for IP data flow 200 across the radio interface 213 is established, comprising the segmentation entity 210, the physical layer 214 and the re-assembly entity 211.

If a second IP data flow 200' emerges, the data packets constituting the IP data flow 200' also require some segmentation operation, but can otherwise be processed in a similar fashion as the data packets of IP data flow 200 on the physical layer 214. To keep the two IP data flows 200 and 200' separate, i.e. to establish two separate transmission paths, according to the present invention, a new Flow-ID 212a and 212a' is added to the PDUs 212 and 212', respectively. For the first IP data flow 200, the Flow-ID 212a may for instance be "1", and for the second IP data flow 200', the Flow-ID 212a may for instance be "2". When the receiving node receives a PDU with Flow-ID 212a', a new re-assembly entity 211' is automatically established for handling the re-assembly. The two flows 200 and 200' are thus kept separate, and there is no mix of segments of data packets between the two flows 200 and 200'.

Removal of data transmission paths, i.e. their constituting entities, may take place based on similar rules as demonstrated for the ARQ entities in the example of FIG. 1: Once a data transmission path has been inactive until the expiration of a pre-defined timer value, the related processing entities 210, 210', 211 and 211' can be deleted in the transmitting and receiving nodes. If a flow re-emerges, the old entities may again be re-established, or, if the identifier is already used, new entities with new identifiers may be established. In both examples, the peer entities only need to exist until all upper layer packets have been processed.

The present invention further permits configuration of entities that were dynamically established. To this end, signalling fields to change the configuration of the receiving entity "on the fly" are defined so that no a-priori configuration is needed.

Figure 3:
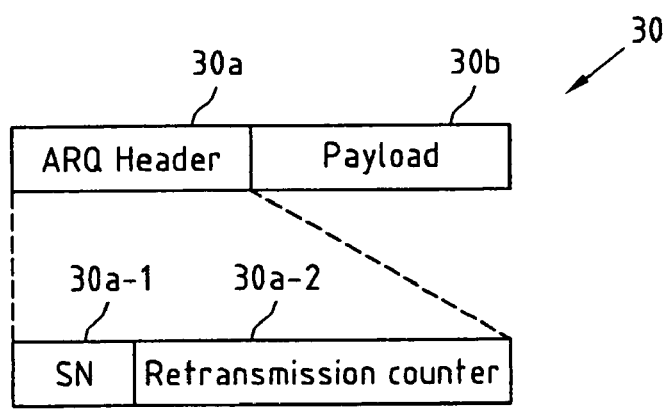
FIG. 3: a schematic presentation of the modification of a protocol header for in-band configuration of ARQ protocol entities according to the present invention.

This approach is illustrated with reference to FIG. 3, which depicts an ARQ PDU 30 consisting of an ARQ header 30a and a payload section 30b. According to the present invention, the ARQ header section includes a Sequence Number (SN) 30a-1, as known in prior art, and additionally includes a "Retransmission counter" field 30a-2. This field 30a-2 represents in-band configuration information that can be used at the receiving node to configure an automatically established ARQ instance, as for instance the ARQ instance 11 and 11' of FIGS. 1a-1c. This in-band configuration may work as follows: If, based on QoS information from upper layers, as for instance maximum delay information, the ARQ PDU 30 can be transmitted two times, on the first transmission, the retransmission counter is set to "1", indicating that one retransmission is possible. From this value, the receiving ARQ entity knows that:
1. The ARQ PDU 30 must be acknowledged. If the PDU was received with errors, a negative acknowledgement should be sent to trigger a retransmission of the ARQ PDU 30, and, if there were no errors, a positive acknowledgement should be sent so that the retransmission doesn't take place.
2. Possible other segments of the upper layer data packet shouldn't be discarded yet, because there can be another transmission for this segment.

Figure 4:
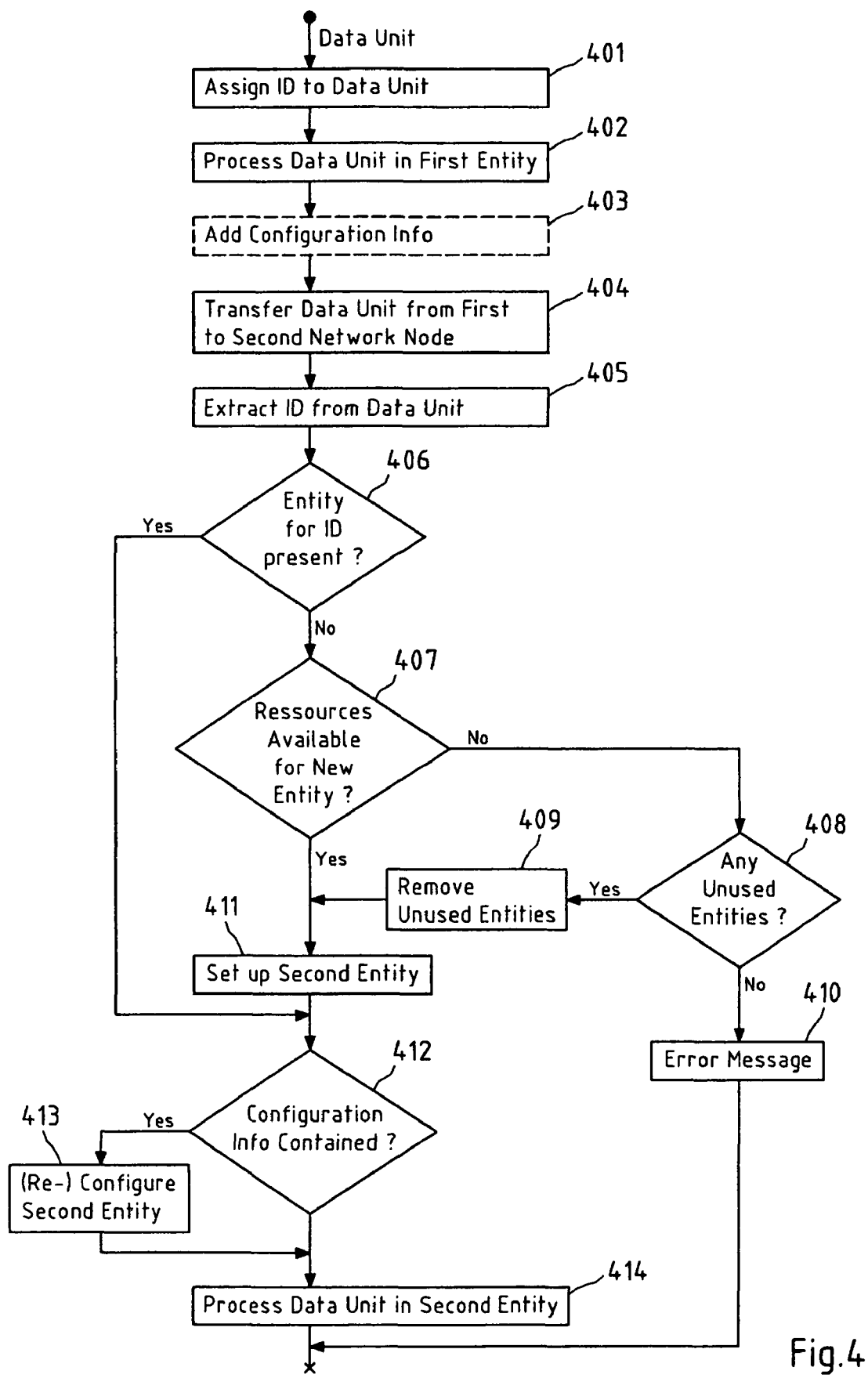
FIG. 4: an exemplary flowchart of a method according to the present invention.

FIG. 4 depicts an exemplary flowchart of a method according to the present invention. Data Units, for instance data packets from a higher layer data flow, are assigned an ID in a step 401. Said ID associates said data units with a first entity in a transmitting (or first) network node. In a step 402, the data unit is processed in said first entity, for instance a coding function may be applied, or a sequence number for ARQ may be added. Said first entity may also perform said step 401 of assigning said ID to said data unit. In an optional step 403, which is shown as a dashed box in FIG. 4, in-band configuration information is added to said data unit. This information may for instance be QoS information obtained from higher layers. Then, in a step 404, the data units are transferred from the transmitting to the receiving (or second) network node. At the receiving network node, at first the ID is extracted or read from the data unit in a step 405. It is then checked in a step 406, if a second entity associated with the extracted ID is already set up in said receiving network node, for instance due to the prior reception of data units with the same ID. If this is not the case, it is checked in a step 407 whether resources are available in said receiving network node to set up a second entity for the processing of said received data unit. If resources are available, this second entity is set up in a step 411. Otherwise, it is checked in a step 408 if any unused entities are still blocking resources in said receiving network node. This may comprise checking the time since the last reception or processing of data units by all set up second entities in said receiving network node and comparing this time against a pre-defined threshold value. Detected unused second entities are removed in a step 409, and then step 411 for setting up a new second entity for said received data unit is performed. If no unused entities are detected in step 408, the receiving network node is not capable of establishing further second entities, and an error message is output in a step 410. After the step 411 of setting up a new second entity, it is checked in a step 412 if said data unit contains configuration information as may optionally have been included into the data unit in step 403. This is also checked for if the check of step 406 indicated that a second entity for the processing of data units with the extracted ID already exists in said receiving network node. If configuration information is contained in said data unit, the second entity that is associated with the currently considered data unit via its ID is in-band configured or re-configured in a step 413 based on said configuration information. If no configuration information is detected in said step 412, the data unit is directly handed to step 414 that performs processing of the data unit in the second entity. This processing of said data unit in said second entity is associated with the processing of said data unit at the transmitting network node in step 402, for instance a decoding function or ARQ processing may be performed.

Figure 5:
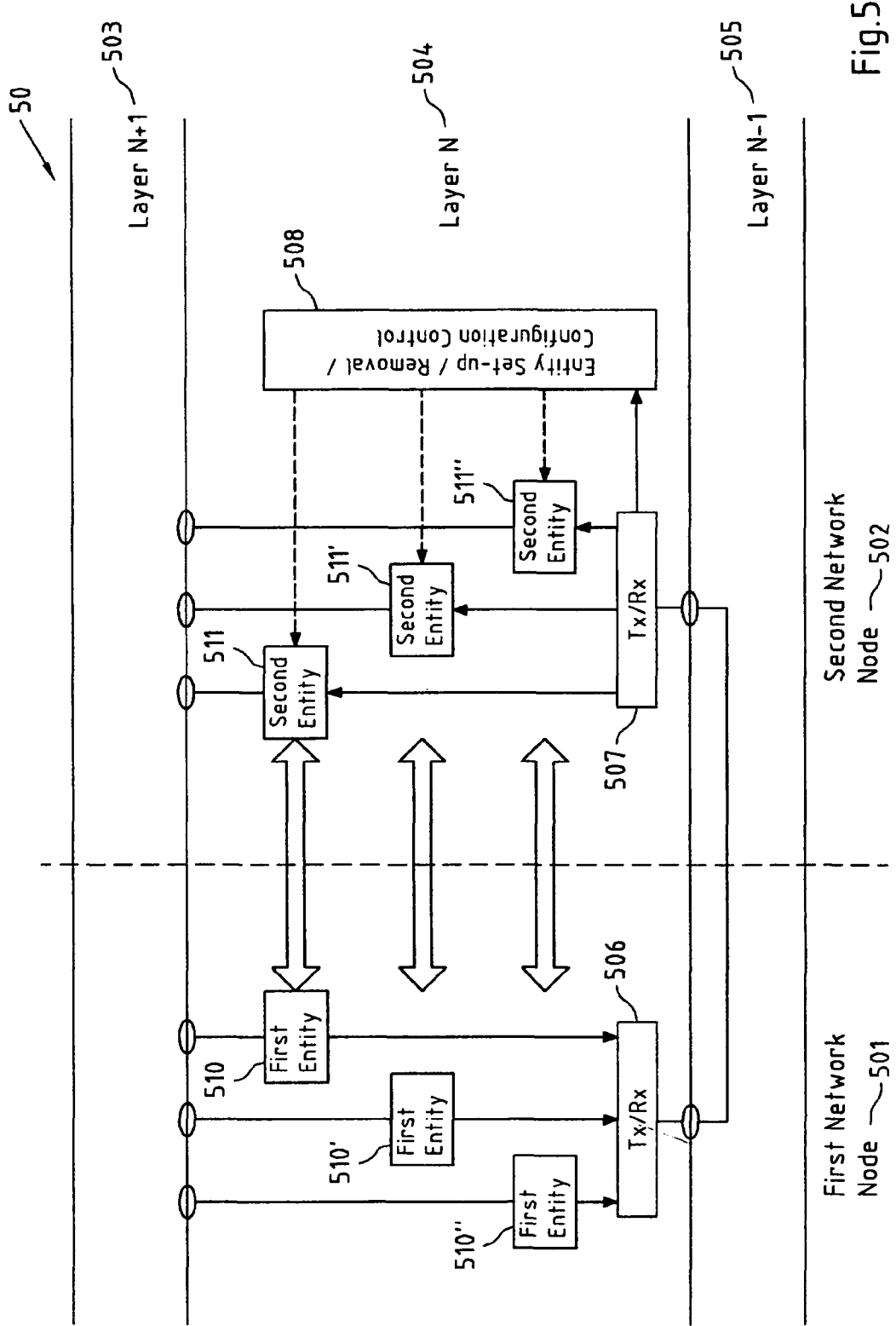
FIG. 5: a schematic presentation of the components of a system according to the present invention.

FIG. 5 is a schematic presentation of the components of a system 50 according to the present invention. FIG. 5 is vertically structured into three layers of a protocol stack, with an upper layer N+1 503, a center layer N 504, and a lower layer N−1 505. FIG. 5 is horizontally structured into a first network node 501, whose components are depicted on the left, and a second network node 502, the components of which are depicted on the right. Note that, for the example of FIG. 5, only the case of transfer of data units from the first to the second network is depicted. The changes in FIG. 5 to allow for a bi-directional transfer of data units will be evident to anyone of skill in the art and thus are not included here for simplicity of presentation.

In FIG. 5, the first network node 501 comprises three first layer-N-entities 510, 510' and 510", wherein each of them is associated with a peer second layer-N-entity 511, 511' and 511" of said second network node 502. Together, each pair of peer entities provides a function that is related to the transfer of data units the payload of which stems from three respective data flows from layer N+1. These data flows from layer N+1 request the services from layer N that are provided by said peer layer-N-entities. Said services may for instance be bare transmission, as for instance is provided by a transparent bearer, or transmission with error correction, as for instance is provided by the RLC protocol (a non-transparent bearer), or any other transfer related function. The data packets of the three data flows are assigned respective IDs by said respective first entities 510, 510' and 510" and then logically transferred to the respective peer entities 511, 511' and 511" as indicated by the three horizontal arrows in FIG. 5. In fact, the logical transmission of the data units is accomplished by forwarding the data units to a Transmission/Reception (TX/RX) instance 506, which uses the transmission services of layer N−1 to transmit the data units. If said layer N−1 is the physical layer, said transmission service may for instance be a wireless or wire-bound transmission of said data units. Accordingly, in the second network node, the data units are received by a Tx/Rx instance 507. According to the present invention, this Tx/Rx instance comprises additional functionality to read or extract the IDs that were assigned to the data units in the first entities of the first network node. This information is handed to an entity set-up/removal/configuration control instance 508, that checks whether second entities for the processing of data units with said assigned IDs already exist or have to be set up. If a data unit is received, and if for the ID of said data unit, no second entity exists, this second entity is set-up under the control of said instance 508, if resources are available. If no resources are available for the set-up of said second entity, said instance 508 checks whether existing second entities are unused and removes them to create resources for the generation of said required second entity. Said instance furthermore checks if idle times of existing second entities are larger than pre-defined threshold values and accordingly removes such unused second entities. The setup, removal and configuration of entities by said instance 508 is indicated in FIG. 5 by dashed arrows. If a second entity that is associated with the ID of a data unit that is received by said Tx/Rx instance 507 exists or has been set-up, the data unit is processed by said second entity, and the processed data unit is then handed to the layer N+1 as part of a data flow.

The present invention has been described above by means of exemplary embodiments. It should be noted that there are alternative ways and variations which are evident to anyone skilled in the art and can be implemented without deviating from the scope and spirit of the appended claims. In particular, the present invention is not limited to application in RLC or other layer-2 protocols, it may equally well be applied in lower or higher layer protocols. Said entities do not necessarily have to be protocol entities, they shall be considered as any functional or logical means that contribute to the transmission of data units.

The invention claimed is:

1. A method, comprising:
assigning an identifier to at least one data unit of a data flow, wherein said identifier associates said at least one data unit of said data flow with a first entity in a first network node, and without pre-negotiating setup of said data flow by exchange of setup signalling prior to actual transfer of said at least one data unit of said data flow, transferring said at least one data unit of said data flow from said first network node to a second network node;
wherein establishment of a second entity in said second network node, which does not exist at a reception of a first data unit of said at least one data unit at said second network node, is enabled by said transferring said at least one data unit of said data flow to said second network node upon said reception of said first data unit of said at least one data unit and is associated with said at least one data unit via said identifier, and
implementing, by said first entity, a function for joint implementation by said second entity in said second network node and related to said transferring of said at least one data unit of said data flow from said first network node to said second network node.

2. The method of claim 1, wherein said function comprises said first entity performing segmentation of data units of said data flow in said first network node and said second entity performing re-assembly of said data units of said data flow in said second network node.

3. A system, comprising:
a first network node; and
a second network node, wherein
said first network node is configured to assign an identifier to at least one data unit of a data flow, wherein said identifier associates said at least one data unit of said data flow with a first entity in said first network node,
wherein said first network node is further configured, without pre-negotiating setup of said data flow by exchange of setup signalling with said second network node, to transfer said at least one data unit of said data flow from said first network node to said second network node,
wherein said second network node is configured to establish a second entity, which does not exist at a reception of a first data unit of said at least one data unit of said data flow at said second network node, in said second network node upon said reception of said first data unit of said at least one data unit of said data flow, and wherein said second entity is associated with said at least one data unit of said data flow via said identifier, wherein said first and second entity are configured to jointly implement a function related to the transfer of said at least one data unit of said data flow.

4. The system according to claim 3, wherein said function comprises said first entity performing segmentation of data units of said data flow in said first network node and said second entity performing re-assembly of said data units of said data flow in said second network node.

5. An apparatus, comprising:
a receiver configured to receive at least one data unit of a data flow from a network node, wherein said at least one data unit of said data flow is associated with a first entity in said network node via an identifier, and
a processor configured to establish a second entity, which does not exist at a reception of a first data unit of said at least one data unit of said data flow at said apparatus, in said apparatus upon reception of said first data unit of said at least one data unit of said data flow, without previous reception of setup signalling from said network node, wherein said second entity is associated with said at least one data unit of said data flow via said identifier, and wherein said first entity and said second entity are configured to jointly implement a function related to transfer of said at least one data unit of said data flow from said network node to said apparatus.

6. The apparatus according to claim 5, wherein said second entity is set up at least partially with pre-defined set-up parameters.

7. The apparatus according to claim 5, wherein parameters of said second entity can be modified by in-band or explicit signalling.

8. The apparatus according claim 5, wherein said first and second entities are peer protocol entities that are configured to at least partially operate a protocol between said apparatus and said network node.

9. The apparatus according to claim 5, wherein said data units of said data flow stem from packet-based traffic.

10. The apparatus according to claim 9, wherein said data units of said data flow stem from Internet protocol based traffic.

11. The apparatus according to claim 5, wherein said apparatus and said network node are elements of an at least partially wireless data transmission network.

12. The apparatus according to claim 11, wherein said protocol is a radio link control protocol.

13. The apparatus according to claim 5, wherein said apparatus is a terminal of an at least partially wireless data transmission network.

14. The apparatus according to claim 5, wherein said apparatus is a network element of an at least partially wireless data transmission network.

15. The apparatus according claim 5, further configured to remove said second entity if, for a predetermined time, no data units of said data flow associated with said second entity have been transferred from said network node to said apparatus.

16. The apparatus according to claim 5, wherein different data units are associated with respective data flows via respective identifiers, and wherein said apparatus is further configured to
check if a maximum number of second entities corresponding to said respective data flows has been set up in said apparatus, and, if this is the case,
to check if, for a predetermined time, no data units associated with one of said second entities have been transferred from said network node to said apparatus, and, if this is the case for said one of said second entities,
to remove said one second entity.

17. The apparatus according to claim 5, wherein said apparatus is configured to process, to configure said second entity, information related to transfer of said at least one data unit of said data flow added to said at least one data unit of said data flow in said network node.

18. The apparatus according to claim 5, wherein said function comprises said first entity performing segmentation of data units of said data flow in said network node and said second entity performing re-assembly of said data units of said data flow in said apparatus.

19. An apparatus, comprising:
a processor configured to assign an identifier to at least one data unit of a data flow, wherein said identifier associates said at least one data unit of said data flow with a first entity in said apparatus; and
a transmitter configured to transfer, without previous transmission of setup signalling from said apparatus, said at least one data unit of said data flow from said apparatus to a network node to trigger establishment of a second entity, which does not exist at a reception of a first data unit of said at least one data unit of said data flow at said network node, in said network node upon said reception of said first data unit of said at least one data unit of said data flow, wherein said second entity is associated with said at least one data unit of said data flow via said identifier, wherein said first and second entity are configured to jointly implement a function related to the transfer of said at least one data unit of said data flow from said apparatus to said network node.

20. The apparatus according to claim 19,
wherein said apparatus is configured to remove said first entity if, for a predetermined time, no data units of said data flow associated with said respective first entity have been transferred from said apparatus to said network node.

21. The apparatus according to claim 19, wherein said apparatus is configured to add information related to the transfer of said at least one data unit of said data flow to said network node to be processed in said network node to configure said second entity.

22. The apparatus according to claim 19, wherein said apparatus is a terminal of an at least partially wireless data transmission network.

23. The apparatus according to claim 19, wherein said apparatus is a network element of an at least partially wireless data transmission network.

24. The apparatus according to claim 19, wherein said function comprises said first entity performing segmentation of data units of said data flow in said apparatus and said second entity performing re-assembly of said data units of said data flow in said network node.

25. A method, comprising:
receiving at a second network node, without previously receiving setup signalling from a first network node for setup prior to actual data flow from said first network node, said at least one data unit of said data flow from said first network node, wherein said at least one data unit of said data flow is associated with a first entity in said first network node via an identifier, and
establishing a second entity, which does not exist at a reception of a first data unit of said at least one data unit of said data flow at said second network node, in said second network node upon said reception of said first data unit of said at least one data unit of said data flow, wherein said second entity is associated with said at least one data unit via said identifier, wherein said second entity is configured to implement, together with said first entity, a function related to transfer of said at least one data unit of said data flow.

26. The method according claim 25, wherein said function comprises said first entity performing segmentation of data units of said data flow in said first network node and said second entity performing re-assembly of said data units of said data flow in said second network node.

27. A computer program embodied in a non-transitory computer-readable medium with instructions operable to cause a processor to perform the method of claim 25.

28. The apparatus according to claim 26, wherein said function related to the transfer of said at least one data unit of said data flow is an automatic repeat request function.

29. The method according to claim 26, wherein said function related to the transfer of said at least one data unit of said data flow is a segmentation and re-assembly function or a blocking and de-blocking function or a concatenation and separation function or a multiplexing and de-multiplexing function or a splitting and combining function.

30. Apparatus, comprising:
means for assigning an identifier to at least one data unit of a data flow, wherein said identifier associates said at least one data unit of said data flow with a first entity in said apparatus, and without pre-negotiating setup of said data flow by exchange of setup signalling prior to actual transfer of said at least one data unit of said data flow;
means for transferring said at least one data unit of said data flow from said apparatus to a network node, wherein establishment of a second entity in said network node, which does not exist at a reception of a first data unit of said at least one data unit at said network node, is enabled by said transferring said at least one data unit of said data flow to said network node upon said reception of said first data unit of said at least one data unit and is associated with said at least one data unit via said identifier; and
means for implementing, a function for joint implementation by said second entity in said network node and related to said transferring of said at least one data unit of said data flow from said apparatus to said network node.

31. The apparatus according to claim 30, wherein said function comprises said first entity performing segmentation of data units of said data flow in said apparatus and said second entity performing re-assembly of said data units of said data flow in said network node.

32. An apparatus, comprising:
means for receiving at least one data unit of a data flow from a network node, without pre-negotiating setup of said data flow by exchange of setup signalling prior to said receiving said at least one data unit of said data flow from said network node, wherein said at least one data unit of said data flow is associated with a first entity in said network node via an identifier, and
means for establishing a second entity, which does not exist at a reception at said apparatus of a first data unit of said at least one data unit of said data flow, in said apparatus upon said reception of said first data unit of said at least one data unit of said data flow, wherein said second entity is associated with said at least one data unit via said identifier, wherein said first and second entity are configured to jointly implement a function related to the transfer of said at least one data unit of said data flow from said network node to said apparatus.

33. The apparatus according to claim 32, wherein said function comprises said first entity performing segmentation of data units of said data flow in said apparatus and said second entity performing re-assembly of said data units of said data flow in said network node.

* * * * *